United States Patent

Schneider et al.

(10) Patent No.: US 9,160,413 B2
(45) Date of Patent: Oct. 13, 2015

(54) TRANSMITTER, COMMUNICATIONS SYSTEM AND METHOD FOR TRANSMITTING DATA SIGNALS

(71) Applicant: Sony Corporation, Minato-ku (JP)

(72) Inventors: Daniel Schneider, Stuttgart (DE); Andreas Schwager, Waiblingen (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/359,465

(22) PCT Filed: Oct. 10, 2012

(86) PCT No.: PCT/EP2012/004250
§ 371 (c)(1),
(2) Date: May 20, 2014

(87) PCT Pub. No.: WO2013/079138
PCT Pub. Date: Jun. 6, 2013

(65) Prior Publication Data
US 2014/0286445 A1 Sep. 25, 2014

(30) Foreign Application Priority Data

Nov. 28, 2011 (EP) .................................... 11009395

(51) Int. Cl.
*H04L 27/02* (2006.01)
*H04B 3/54* (2006.01)
*H04L 1/06* (2006.01)
(Continued)

(52) U.S. Cl.
CPC .............. *H04B 3/542* (2013.01); *H04L 1/0606* (2013.01); *H04L 1/0618* (2013.01); *H04L 27/2627* (2013.01); *H04B 2203/5408* (2013.01); *H04L 2001/0093* (2013.01)

(58) Field of Classification Search
CPC ......................................................... H04B 3/54
USPC ......................................................... 375/257
See application file for complete search history.

(56) References Cited

U.S. PATENT DOCUMENTS

| 8,861,574 B2 * | 10/2014 | Lai et al. ........................ 375/219 |
| 8,873,756 B2 * | 10/2014 | Schwager ...................... 380/270 |
| 2004/0066283 A1 | 4/2004 | Manis et al. |

(Continued)

OTHER PUBLICATIONS

International Search Report and Written Opinion issued Nov. 29, 2012 in PCT/EP2012/004250.

(Continued)

*Primary Examiner* — Jaison Joseph
(74) *Attorney, Agent, or Firm* — Oblon, McClelland, Maier & Neustadt, L.L.P.

(57) ABSTRACT

A transmitter for transmitting data signals to at least one communications device over a wired network on a plurality of carriers is provided, wherein the carriers are located in frequencies being allocated by one or more radio services, wherein each of the radio services is allocated to one or a plurality of frequency bands, the transmitter comprising a symbol generator configured to generate symbols based on the data signals; a processor configured to generate copies of the symbols and to determine an allocation of the copies onto the plurality of carriers, wherein a first copy and a second copy of each symbol are allocated to carriers located in frequency bands that are allocated to different radio services; and a modulator configured to modulate the copies of the symbols on the carriers in accordance with the determined allocation.

15 Claims, 8 Drawing Sheets

(51) Int. Cl.
*H04L 27/26* (2006.01)
*H04L 1/00* (2006.01)

(56) References Cited

U.S. PATENT DOCUMENTS

2008/0170540 A1  7/2008  Fukuda
2008/0191851 A1  8/2008  Koga
2011/0200058 A1  8/2011  Mushkin et al.

OTHER PUBLICATIONS

"ITU-T Recommendation G.992.1; Asymmetric Digital Subscriber Line (ADSL) Transceivers" ITU-T Drafts: Study period 1997-2000, International Telecommunication Union, vol. Study Group 15, XP017487087, Jun. 22, 1999, pp. 1-252.

"PLC G3 Physical Layer Specification" ERDF, undated, pp. 1-46.

"The European Table of Frequency Allocations and Utilisations in the Frequency Range 9 kHz to 3000 GHz" Electronic Communications Committee (ECC), vol. ERC Report 25, Aug. 21, 2013, 251 Pages.

"Power line communication apparatus used in low voltage installations—Radio disturbance characteristics—Limits and methods of Measurement—Part 1: Apparatus for in-home use" European Standard, CENELEC, Final Draft, vol. FprEN 50561-1, Jun. 2011, 24 Pages.

"HomePlug AV Specification" HomePlug Powerline Aliance, vol. 1, No. 1, May 21, 2007, 673 Pages.

* cited by examiner

TRANSMITTER, COMMUNICATIONS SYSTEM AND METHOD FOR TRANSMITTING DATA SIGNALS

CROSS-REFERENCE TO RELATED APPLICATIONS

The present application claims priority to European Patent Application 11 009 395.2, filed in the European Patent Office on Nov. 28, 2011, the entire contents of which being incorporated herein by reference.

The disclosure relates to a transmitter for transmitting data signals, to a communications system for transmitting data signals between a transmitter and a receiver and to a method for transmitting data signals.

BACKGROUND

Usually, powerline modems adapt communication parameters (adaptive modulation) to channel characteristics in order to increase the throughput and reliability. This adaptation requires channel state information at the transmitter and therefore requires feedback from the receiver to the transmitter.

In some cases the transmitter cannot use channel state information, for instance for initial communication (before adapting to the channel characteristics) or for broadcast messages (messages to all stations in the network).

In those cases, powerline modems generally use a robust communication mode (ROBO mode). For instance, the HomePlug standard specifies a ROBO mode where each OFDM (orthogonal frequency-division multiplexing) subcarrier is modulated with the same QAM (quadrature amplitude modulation) constellation (QPSK (quadrature phase-shift keying) in HomePlug). In addition to the forward error correction (FEC), a repetition code is used where each coded bit is repeated two or four times. With these parameters the communication becomes very robust and is designed to work for practically all links within powerline networks.

In order to comply with electromagnetic interference (EMI) regulations some frequencies have to be notched. The frequencies to be notched may vary in different countries. The frequencies to be notched are specified by a so-called tone mask, which is stored in the powerline modems. In order to guarantee interoperability the tone mask has to be the same for all modems (default broadcast tone mask in the HomePlug standard).

The tone masks might be different for different countries. In general, the tone mask for North America (NA mask) is considered the default broadcast tone mask. In a tone mask it is determined which carriers are used during the transmission of data. The tone mask is known at a transmitting side and at a receiving side. Further notched frequencies according to tone masks of other countries can be implemented by using amplitude maps. In the amplitude maps it is specified that no power is allocated to the further frequencies which are additionally to be notched.

If tone masks for different countries do not correspond to each other, performance degradation at the receiver may occur. For example, the receiver expects information on notched subcarriers. To some extent the lost information can be compensated by the forward error correction and copy coding. Copy coding (also called diversity copying in the HomePlug standard) uses frequency diversity (some subcarriers are highly attenuated; some subcarriers show only a small attenuation). However, the copy coding does not take into account the potentially notched subcarriers. Consequently, all copies may fall on the notched subcarriers.

It is an object of the disclosure to provide a transmitter, a communications system and a method for transmitting data which provide enhanced certainty that transmitted data is actually received by a receiver.

The object is achieved by the subject-matter of the independent claims. Further embodiments are specified in the dependent claims, respectively. Details of the disclosure will become more apparent from the following description of embodiments in connection with the accompanying drawings, wherein features of the various embodiments may be combined unless they exclude each other.

DETAILED DESCRIPTION OF THE EMBODIMENTS

Figure 1:
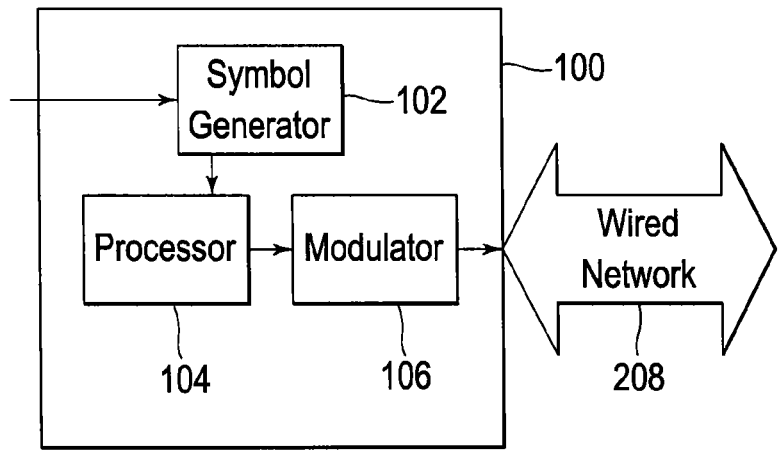
FIG. 1 shows a schematic block diagram of a transmitter according to an embodiment of the disclosure.

In FIG. 1 a schematic block diagram of a transmitter 100 for transmitting data signals is depicted.

The transmitter 100 includes a symbol generator 102 configured to generate symbols based on data signals. For instance, the symbol generator might be realized as a quadrature amplitude modulator (QAM), the symbols being generated in accordance with BPSK (binary phase-shift keying), QPSK (quadrature phase-shift keying), 2-QAM, 4-QAM, 8-QAM, 16-QAM, 64-QAM, 256-QAM or corresponding other modulation schemes.

The transmitter 100 further comprises a processor 104 configured to generate copies of the symbols and to determine an allocation of the copies onto a plurality of carriers, wherein a first copy and a second copy of each symbol are allocated to carriers located in frequency bands that are allocated to different radio services. That is, the first copy of a symbol will be allocated to a carrier located in a frequency band allocated to a radio service, while the second copy of the same symbol will be allocated to a carrier located in a frequency band which is not allocated to the same radio service, but to another radio service. The same applies to the copies of the other symbols.

The term "copy of a symbol" includes the original of a symbol as well. For instance, if an original and one copy of the original are allocated to the carriers, two copies of the symbol carrying the same information are allocated. Also, "generating copies of a symbol" may include providing the original symbol and at least one additional copy of the symbol. In current implementation schemes for robust communication schemes (ROBO mode) 2, 4 or 5 copies are used; however, further copies are possible as well.

The processor 104 might also be referred to as "diversity copier".

Further, the transmitter 100 includes a modulator 106 configured to modulate the copies of the symbols onto the carriers in accordance with the determined allocation. The modulator 106 might be realized as an OFDM-modulator, which modulates the symbols on a set of subcarriers.

Afterwards, the carriers are transmitted on a wired network 108 which is schematically depicted in FIG. 1. The wired network might be e.g. a powerline network or a DSL (digital subscriber line) network. The transmitter might be realized as a powerline modem or as a DSL modem.

In the wired network 108 the carriers are located on frequencies that are allocated to radio services, wherein the frequency range of all radio services is preferably allocated among the total HF (high frequency) and VHF (very high frequency) range by allocating to each radio service one or a plurality of frequency bands of the frequency range.

With this approach, carriers for transmitting identical information are allocated in a way that frequencies allocated by individual radio services are never used by more than one carrier. For example, the radio service "RADIO ASTRONOMY" allocates the following frequency bands: 13360 to 13410 kHz, 25550 to 25670 kHz, 37.5 to 38.25 MHz, and 70.45 to 74.8 MHz. If the powerline communication modem or transmitter is operated in vicinity of a radio astronomy station, all those frequencies might be omitted from transmission (for instance via an amplitude map that is stored in the transmitter or via an internal measurement unit in the transmitter that is configured to identify external disturbances). A receiver specified e.g. by the HomePlug standard is not aware of the frequency exclusions in the radio astronomy bands (the encoding follows the broadcast tone mask). If the carrier allocations are done in a way that maximum one frequency carrier out of several carriers carrying identical information is located inside the radio astronomy bands, the system guarantees that the other carriers will be received by the second powerline communication modem.

Further examples for the radio services are
aeronautical mobile (or) service (of route services),
aeronautical radio navigation, fixed service,
land mobile service,
maritime mobile service,
maritime radio navigation service,
meteorological aids service,
mobile radio service,
astronomy service,
radiolocation service,
radionavigation service,
standard frequency and a time service,
industrial, scientific and medical (ISM) services,
RFID services,
EAS (electronic article surveillance) service,
meteorological-satellite service,
mobile-satellite service,
space operation service,
space research service
or other services.

According to the ITU (International Telecommunication Union) Radio Regulations, each radio service may have more than one frequency range allocation. To select the optimum frequency for the radio transmissions, several allocations may be reserved for a radio service.

The frequencies allocated to an individual radio service shall not be allocated more than once to powerline frequency carriers transmitting identical information. The frequency bands for the radio services can be found e.g. in ERC Report 25, the European table of frequency allocations and utilizations in the frequency range 9 kHz to 3000 GHz or in the ITU Radio Regulations.

If, for instance, Norway decides that maritime service frequencies shall be excluded in coast regions from powerline communication, only the amplitude map of the modems will be programmed to implement the notches. The diversity copier according to this disclosure guarantees that redundant transmitted information is allocated as rarely as possible to one individual radio service allocations. Since it is highly unlikely that all of the allocated frequencies are notched out if they "belong" to different radio services, it is ensured that all information is safely received.

Powerline communication modems operating at one location might be interfered by a single application. For instance, a powerline communication modem running in a shop or warehouse might be interfered by EAS services operated in the same building. Powerline communication modems operating close to an airport might be interfered by aeronautical services. This interference may reduce the signal to noise ratio (SNR) of powerline communication transmissions in all frequency bands allocated to aeronautical services. If redundant transmitted information is not copied more than once to frequencies allocated by a single radio service, only one of the copies could be interfered by this single radio service. Here, a radio service is the aeronautical services. The frequencies of the aeronautical services may be used by multiple individual radio transmissions from airplanes to the airport or vice versa. The aeronautical services are located at 2.85-3.025 MHz, 3.4-3.5 MHz, 4.65-4.7 MHz, 5.48-5.68 MHz, 6.525-6.685 MHz, 8.815-8.965 MHz, 10.005-10.1 MHz, 11.275-11.4 MHz, 13.26-13.36 MHz, 17.9-17.97 MHz and 21.924-22.00 MHz.

For instance, RFID and EAS services are allocated at 3.15 to 3.4 MHz (EAS), 7.4 to 8.8 MHz (EAS), 10.2 to 11 MHz (EAS), 13 to 13.2 MHz (RFID), and 13.9 to 14.1 MHz (RFID).

Figure 2:
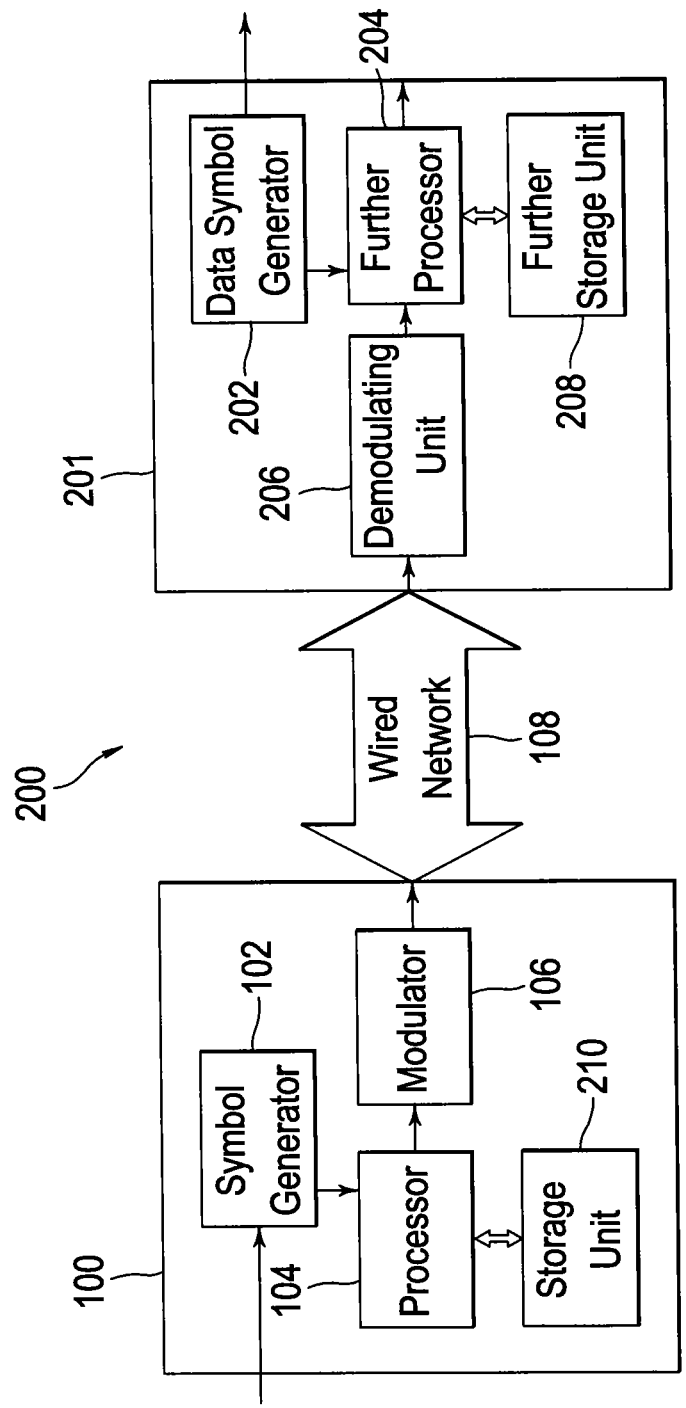
FIG. 2 shows a schematic block diagram of a system according to an embodiment of the disclosure, FIG. 3 schematically shows steps of a method according to an embodiment of the disclosure, FIG. 4 schematically shows schematically an allocation of symbols and their copies according to an embodiment of the disclosure.

In FIG. 2 a schematic block diagram of a system 200 for transmitting data between the transmitter 100 and a receiver 200 on the wired network 108 is depicted. The receiver 201 includes a demodulating unit 206, a further processor 204 and a data signal generator 202. The signals received via the wired network 108 are demodulated by the demodulating unit 206 and further processed in the processor 204, so that the copied symbols of the individual carriers can be combined. For instance, a maximum ratio combining (MRC) can be used. The allocation scheme of the copies on the plurality of carriers, for instance, is stored as an allocation table in a storage unit 210 on the transmitter 100 side and in a further storage unit 208 on the receiver 201 side, so that the respective processors 104, 204 both are aware of the same allocation scheme in order to enable allocating the copies of the symbols on the carrier in the same way as combining the copies on the receiver 201 side.

Figure 3:
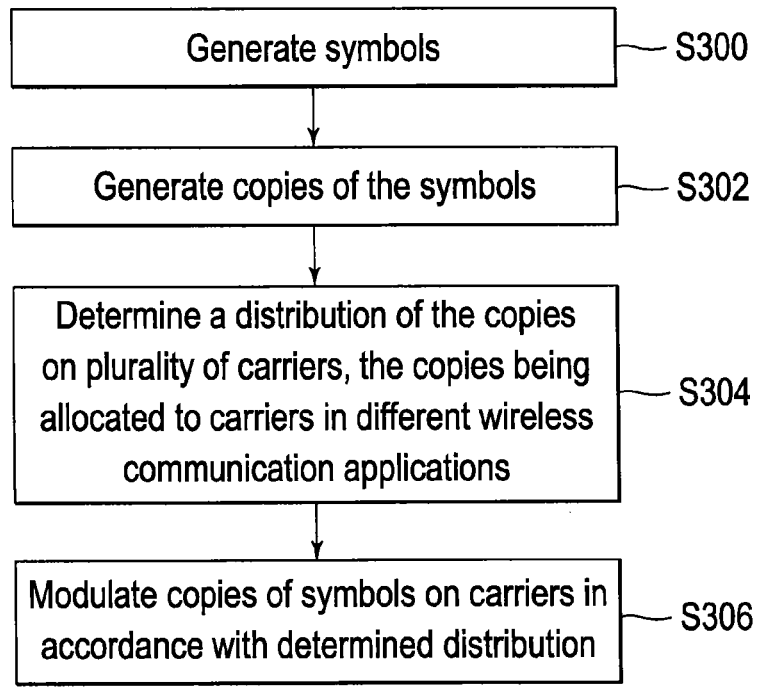

In FIG. 3 a schematic flow diagram of a method according to an embodiment of the disclosure is depicted. In a step S300 symbols are generated based on data signals. Copies of the symbols are generated in step S302.

An allocation of the copies on the plurality of carriers is determined in step S304, wherein the copies of each symbol are allocated to carriers located in frequency bands that are allocated to different radio services.

In step 306 the copies of the symbols are modulated on the carriers in accordance with the determined allocation in step S304.

Figure 4:
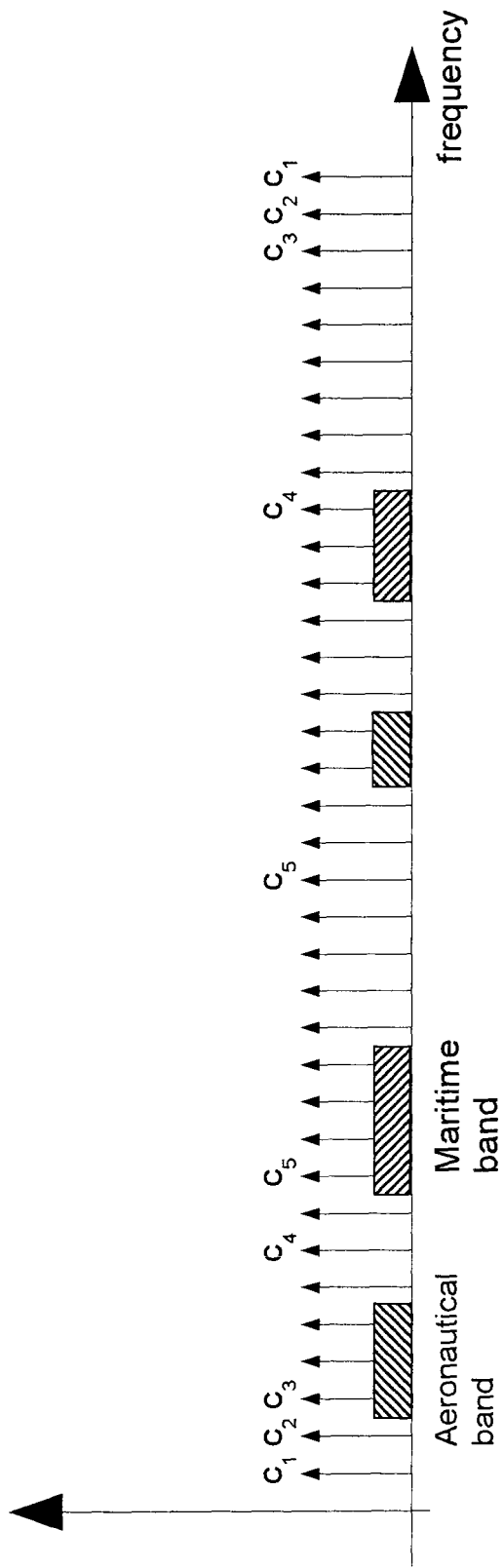

In FIG. 4 an example of the allocation of the copies to OFDM subcarriers (depicted by arrows) according to the described rules is shown. The example uses two copies of each QAM symbol. The first QAM symbol c1 is allocated to the first and the last subcarrier (the same for the second symbol). The third symbol c3 falls in the aeronautical band and the copy shall not be assigned to the same or another aeronautical band. Similarly, the other copies shall not fall into the same band. For instance, one copy of the fifth symbol c5 and of the fourth symbol c4, respectively, is allocated to a frequency in the maritime band, whereas the further copy of the respective fourth symbol c4 or fifth symbol c5 is allocated to a different carrier, which is not part of the maritime band.

Figure 5:
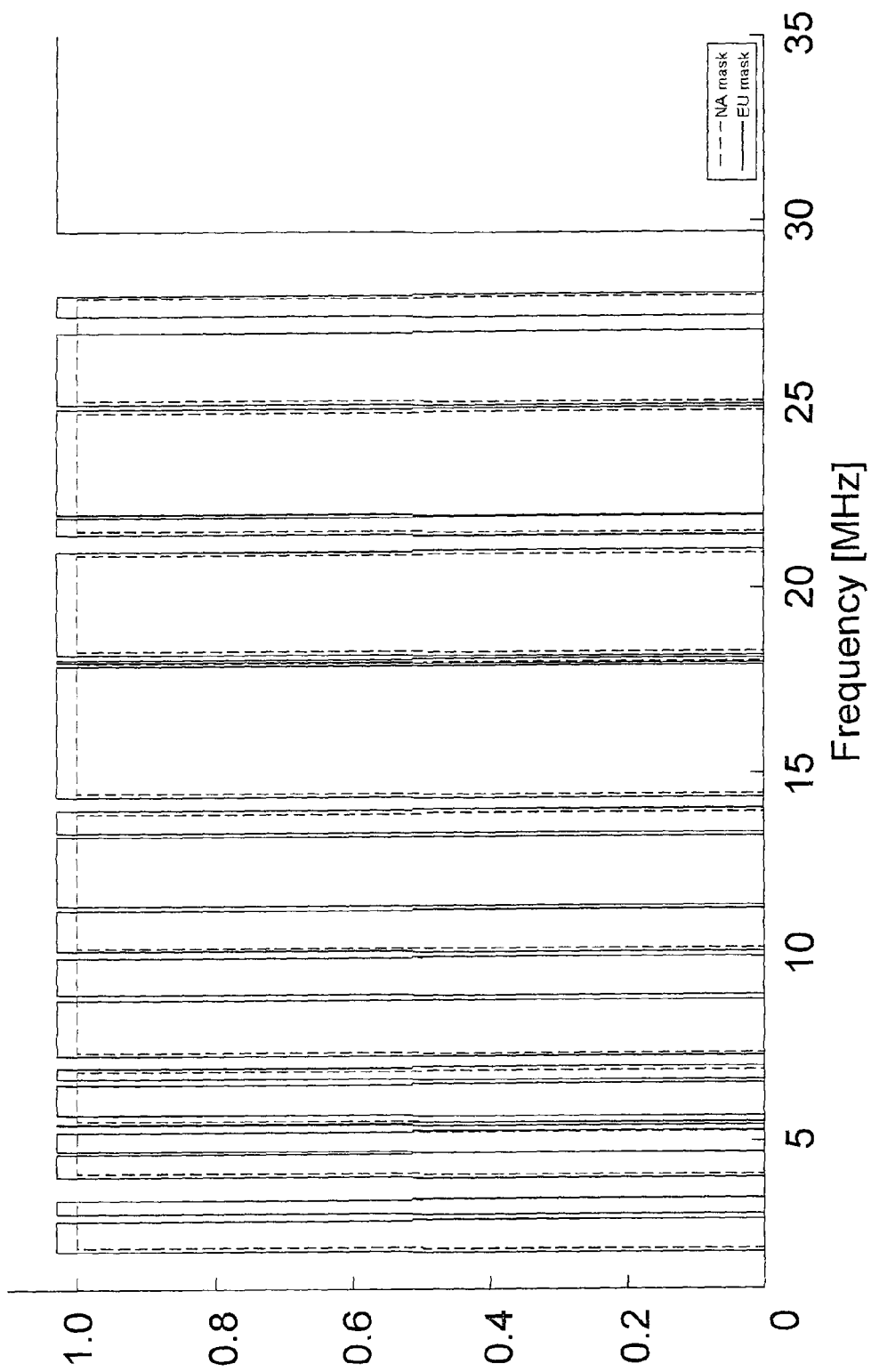
FIG. 5 shows the tone masks for North America and for Europe, FIG. 6 schematically shows the attenuation of signals depending on the frequency, FIG. 7a schematically shows a block diagram of a transmitter according to a further embodiment of the disclosure.

FIG. 5 shows the default broadcast tone mask of the HomePlug standard, the NA (North American) mask. The tone mask is available to the transmitter as well as to the receiver. In Europe additional frequencies have to be notched (see EU mask in FIG. 5). The EU mask is one example of a radio service. The encoding at the transmitter has to comply with the broadcast tone mask (NA mask). The transmitter should also not apply power to the subcarriers which have to be notched additionally (e.g. as specified by the EU mask). This is specified by an amplitude map. Consequently, the frequency carriers that transmit identical information should be allocated in a way that frequencies which are notched by the EU mask (FprEN 50561-1) and not listed in the North American mask are never used by more than one carrier. The HomePlug specification excludes frequencies listed in its North American tone mask.

These frequencies listed in the NA mask are mainly the US HAM (amateur radio) bands plus some guard frequencies beside each band allocation. A HomePlug modem sold in Europe may additionally protect all radio services specified in FprEN 50561-1. These are more frequencies than only the US HAM bands. Further frequencies like the Broadcasting frequencies have to be excluded dynamically or permanently. The diversity copier of the HomePlug receiver modem does not know the additional frequency exclusions (there is only one HomePlug standard worldwide). According to the disclosure, the additional frequencies to be protected by FprEN 50561-1 (compared to North American tone mask) shall be allocated only once with redundant information from powerline transmissions. The standard FprEN 50561-1 protects the following additional radio applications: aeronautical mobile service (route services), civil aircrafts, citizen band radio and radio broadcasting.

Figure 6:
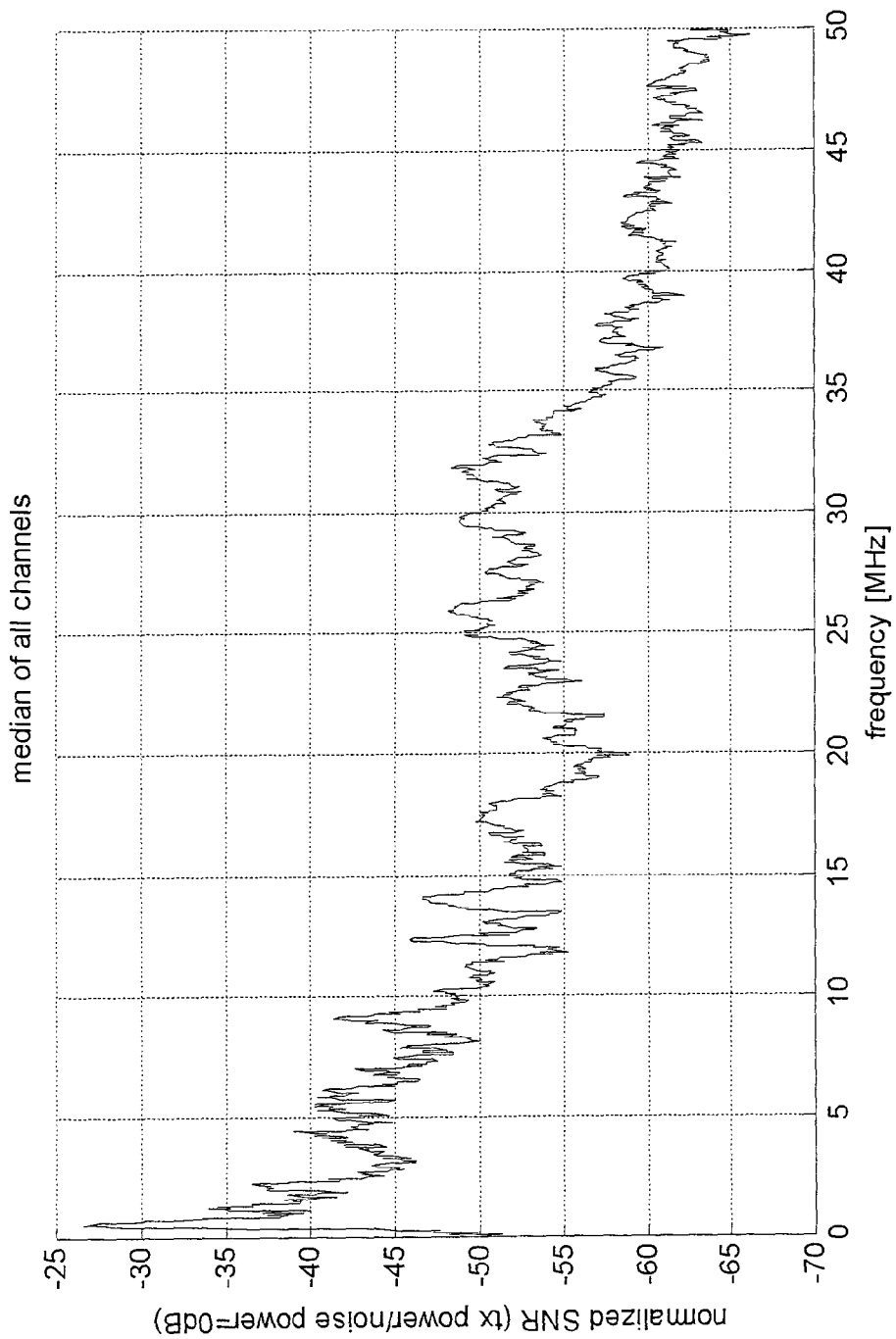

In FIG. 6 the signal to noise ratio is depicted versus the frequency as a median value of many channel realizations. As can be observed from FIG. 6, the higher the frequency is, the higher is the attenuation. Also, the noise is usually higher for lower frequencies and decreases for higher frequencies. To deal with those issues, frequency diversity is achieved by spreading information to carriers located at two or more individual frequencies. According to embodiments of the disclosure, the selection of the frequency is done according to the following principles (let n be the frequency carrier index and N the total number of subcarriers): allocate the lowest frequency carrier (n=1) and highest frequency carrier (n=N), then allocate the second lowest (n=2) and the second highest frequency carrier (n=N−1), continue with a third lowest frequency carrier and so on. This ensures that the strongest subcarrier and the smallest subcarrier are combined according to the decreasing signal to noise ratio of FIG. 6.

The further alternative is to allocate the lowest frequency carrier (n=1) and the subcarrier n=N/2, then allocate the second lowest (n=2) and the subcarrier n=N/2+1, continue with the third lowest and so on. This reflects the fact that noise is reduced towards higher frequencies and attenuation is higher towards higher frequencies. Further, interleaver patterns might be used as well.

Figure 7A:
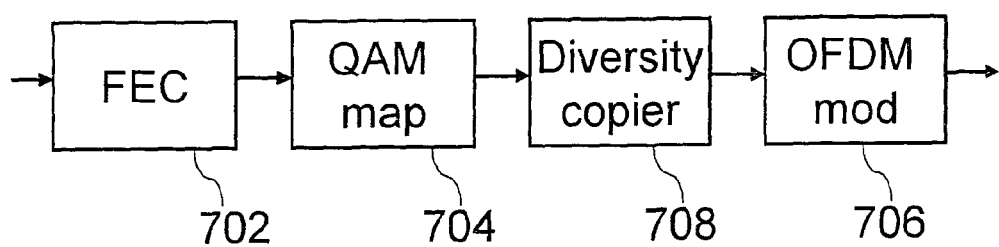
FIG. 7b shows a block diagram of a transmitter according to the further embodiment of the disclosure, FIG. 8 schematically shows the allocation of additional copies on a second subcarrier pair when multiple-input multiple-output (MIMO) encoding based on Alamouti encoding is used, FIG. 9 schematically shows a transmitter according to a further embodiment of the disclosure, and FIG. 10 schematically shows steps of a method according to a further embodiment of the disclosure.

FIG. 7a schematically shows a transmitter with forward error correction 702, QAM mapping 704 and OFDM modulation 706, wherein the diversity copier 708 is located between the QAM mapper 704 and the OFDM modulator 706. The diversity copier 708 assigns copies of the QAM symbols to the OFDM subcarriers. In this embodiment the copy allocation works on the level of QAM symbols.

Figure 7B:
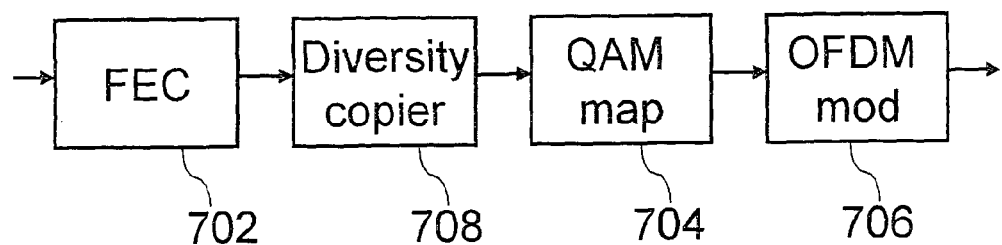

According to FIG. 7b, the copy allocation may be done on a bit level (before QAM mapping) as well. If the copy encoding is performed on bit level, the receiver has to be adjusted accordingly, for instance in addition of the log-likelihood ratio (LLRs) of the QAM demapping.

Figure 8:
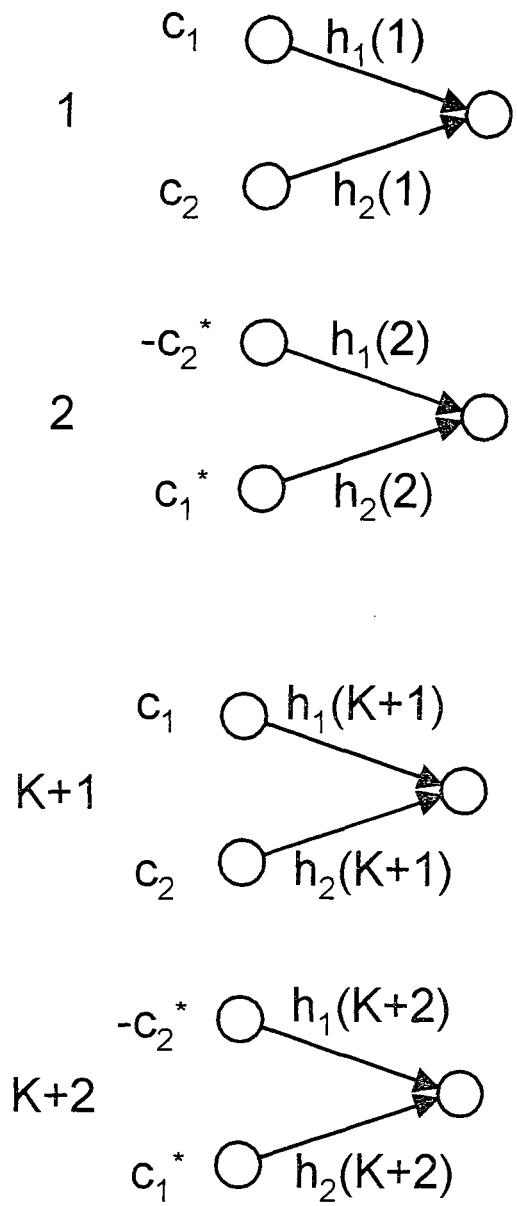

The encoding can be extended to multiple-input multiple-output (MIMO) systems, as it is depicted schematically in FIG. 8. FIG. 8 shows four subcarriers (1, 2, $K_+1$, K+2, and a system with two transmit ports and one receive port). Alamouti encoding is applied to two neighbored subcarriers with the result of splitting the information to the two carriers. The two symbols $c_1$ and $c_2$ are transmitted on the first subcarrier from transmit port 1 and 2, respectively. On the second subcarrier, the conjugate complex of the two symbols is transmitted, i.e. $-c_2^*$ and $c_1^*$ on transmit port 1 and 2, respectively. $h_i(k)$ denote the channel coefficients from transmit port i (i=1, 2) to the receive port of subcarrier k. Additionally, the copies are allocated to another subcarrier pair (subcarriers K and K+1 in FIG. 8) to provide frequency diversity. The allocation of the other frequency pair shall follow the principles introduced above. Alternatively, the Alamouti encoding may be performed in the time domain. Instead of transmitting the additional copies on another frequency pair, the copy can be spread in the time domain. The encoding may be combined in each possible combination (e.g. Alamouti encoding in time domain, additional copies in the frequency domain). Other MIMO schemes can be used as well.

According to an embodiment of the disclosure, the copies of the symbols can be allocated in the time domain instead of, or in addition to, their allocation onto a plurality of carriers. Powerline communication modems often suffer from synchronous noise (for instance synchronous to the 50 Hz line cycle). The encoding of the redundant information (i.e. the different copies of the same symbol) can be performed such that some copies are not affected by this synchronous noise. The noise characteristics of other devices present in the powerline communication network can be taken into account as well.

Figure 9:
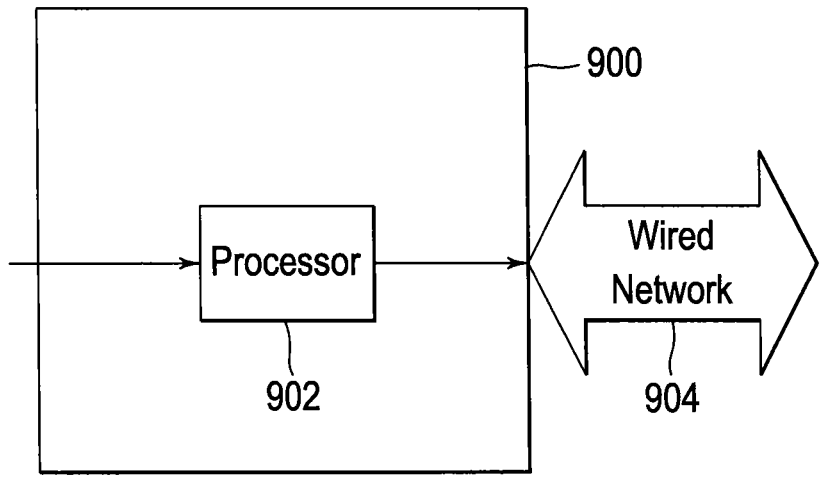

This is explained in more detail in FIG. 9. According to a further embodiment a transmitter 900 includes a processor 902 and is connected to wired network 904. The processor 902 is configured to generate copies of data signals and to determine an allocation of the copies on a plurality of time intervals, wherein the copies of each data signal are allocated to time intervals with different noise characteristics on the wired network 904.

Figure 10:
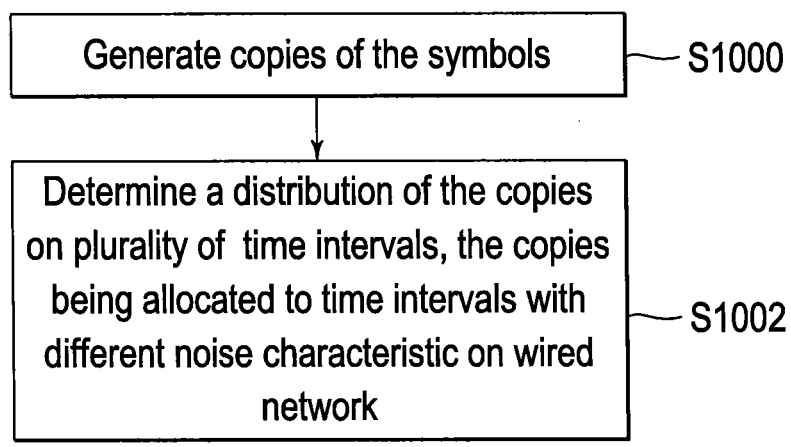

In FIG. 10 a schematic flow diagram for a method according to a further embodiment is depicted.

In step S1000 copies of data signals are generated.

In step S1002 an allocation of the copies on the plurality of time intervals is determined, wherein the copies of each data signal are allocated to time intervals as different noise characteristics on the wired network 904.

When allocating the copies to time intervals with different noise characteristics, it is possible to avoid having two copies of one symbol allocated to time intervals where disturbing sources are present, e.g. in the peaks of alternating current of a mains network.

The allocation of the symbols or data signals in accordance with the embodiments of the disclosure provides new robust (ROBO) modes with improved bit rate and robustness compared to known ROBO modes. A more intelligent allocation of the copies taking into account electromagnetic interference regulation issues and powerline channel characteristics is proposed.

The invention claimed is:

1. A transmitter for transmitting data signals to at least one communications device over a wired network on a plurality of carriers, wherein the carriers are located in frequencies being allocated by one or more radio services, wherein each of the radio services is allocated to one or a plurality of frequency bands, the transmitter comprising:
   circuitry configured to
      generate symbols based on the data signals;
      generate at least four copies of the symbols and to determine an allocation of the copies onto the plurality of carriers, wherein a first copy, a second copy, a third copy and a fourth copy of each symbol are allocated to carriers located in frequency bands that are allocated to different radio services; and
      modulate the copies of the symbols on the carriers in accordance with the determined allocation.

2. The transmitter according to claim 1, wherein one or more of the radio services includes notched frequencies of a tone mask in accordance with European standard FprEN50561-1.

3. The transmitter according to claim 1, wherein one of the radio services includes at least one of Aeronautical Mobile (or) Service, Aeronautical Radionavigation Fixed Service, Land Mobile Service, Maritime Mobile Service, Maritime Radionavigation Service, Meteorological Aids Service, Mobile Radio Service, Astronomy Service, Radiolocation Service, Radionavigation Service, Standard Frequency and Time Service, Industrial, Scientific and Medical ISM Service, Radio Frequency Identification RFID Service, Electronic Article Surveillance (EAS) Service, Meteorological-Satellite Service, Mobile-Satellite Service, Space Operation Service, Space Research Service or others.

4. The transmitter according to claim 1, wherein the copies of each symbol are further allocated to the carriers according to a predetermined algorithm, the predetermined algorithm optimizing the allocation onto the carriers so that copies of a bit or symbol have a high frequency separation in an available frequency range.

5. The transmitter according to claim 1, wherein the copies of each symbol are further allocated to the carriers according to a predetermined algorithm, the predetermined algorithm optimizing the allocation onto the carriers so that all the copies of different symbols have an equal frequency distance.

6. The transmitter according to claim 1, wherein the circuitry is configured to:
   encode the symbols on neighbored sub-carriers of the plurality of carriers;
   generate copies of the encoded data signals; and
   determine an allocation of the copies of the encoded data signals on the plurality of carriers, wherein the copies of each encoded data signal are allocated to neighbored sub-carriers located in frequency bands that are allocated to the different radio services.

7. The transmitter according to claim 1, further comprising a memory configured to store an allocation table, the circuitry configured to determine the allocation based on the allocation table.

8. The transmitter according to claim 1, wherein the circuitry is further configured to generate one or more copies of the data signals and to determine an allocation of the copies on a plurality of time intervals, wherein the copies of each data signal are allocated to time intervals with different noise characteristics on the wired network.

9. The transmitter according to claim 1, wherein the copies are generated only for a robust communication mode (ROBO mode).

10. The transmitter according to claim 1, wherein the carriers are located within a frequency range for communication, and wherein the one or more radio services are distributed within the frequency range for communication.

11. The transmitter according to claim 10, wherein the one or more radio services are distributed within the frequency range for communication by allocating each of the frequencies of the frequency range to at least one of the one or more radio services, or by allocating each of a part of the frequencies of the frequency range to at least one of the one or more radio services.

12. A transmitter for transmitting data signals to at least one communications device over a wired network during a plurality of time intervals, the transmitter comprising:
   a processor configured to generate at least four copies of the data signals and to determine an allocation of the copies on the plurality of time intervals, wherein the copies of each data signal are allocated to time intervals with different noise characteristics on the wired network.

13. A communications system for transmitting data between a transmitter and a receiver on a wired network, the system comprising:
   a transmitter according to claim 1; and
   a receiver comprising circuitry configured to determine the data signal based on received copies of the symbols.

14. A method for transmitting data signals to at least one communications device over a wired network on a plurality of carriers, wherein the carriers are located in frequencies being already allocated by one or more radio services, wherein each of the radio services is allocated to one or a plurality of frequency bands, the method comprising:
   generating symbols based on the data signals;
   generating at least four copies of the symbols;
   determining an allocation of the copies onto the plurality of carriers, wherein the copies of each symbol are allocated to carriers located in frequency bands that are allocated to different radio services; and
   modulating the copies of the symbols on the carriers in accordance with the determined allocation.

15. A method for transmitting data signals to at least one communications device over a wired network during a plurality of time intervals, the method comprising:
   generating at least four copies of the data signals; and
   determining an allocation of the copies on the plurality of time intervals, wherein the copies of each data signal are allocated to time intervals with different noise characteristics on the wired network.

* * * * *